UNITED STATES PATENT OFFICE.

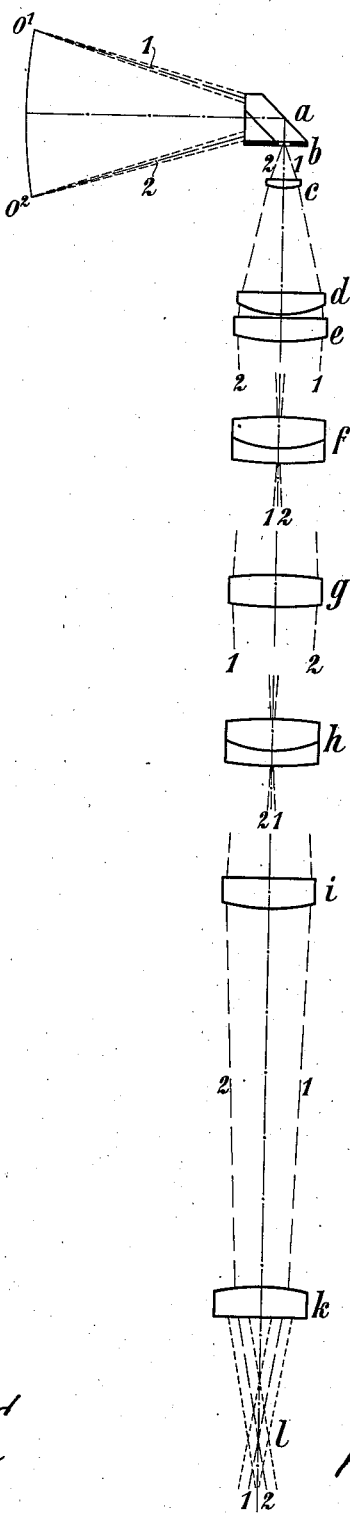

MORITZ VON ROHR, OF JENA, GERMANY, ASSIGNOR TO THE FIRM OF CARL ZEISS, OF JENA, GERMANY.

OPTICAL CYSTOSCOPE SYSTEM.

940,894. Specification of Letters Patent. Patented Nov. 23, 1909.

Application filed July 12, 1909. Serial No. 507,200.

*To all whom it may concern:*

Be it known that I, MORITZ VON ROHR, a citizen of the German Empire, and residing at Carl-Zeiss strasse, Jena, in the Grand Duchy of Saxe-Weimar, Germany, have invented a new and useful Optical Cystoscope System, of which the following is a specification.

The invention relates to optical systems for cystoscopic and like purposes.

The usual system for cystoscopes and the like comprises, in addition to an entrance reflecting prism, an objective lens, a collective lens near the place where a real image of the object is produced by the objective lens, an inverting lens, and an ocular. The diameter of a cystoscope is not allowed to exceed a certain very small value, whereas the length of the instrument must reach a comparatively large value. This peculiarity, together with the low power of the little source of light provided in the instrument, prevents the image presented to the observer from being so bright as the image yielded by any other optical instrument.

The object of the invention is to enhance the luminosity of the optical cystoscope system without reducing its field of view. For this purpose two or more inverting lenses are made use of instead of the one hitherto employed, each of them having a shorter focal distance than that single one, and in combination with each additional inverting lens a collective lens near the image to be reproduced by the said inverting lens is added.

In most cases two inverting lenses are sufficient to realize the invention. It will be understood, that the second inverting lens restores the position of the image produced by the objective lens. According to the invention the final image presented by the instrument with two inverting lenses is made erect by employing as entrance reflecting prism an inverting prism after amici, a so-called ridge prism, having two reflecting surfaces at right angles to each other.

In adapting the front lens system to the shortened focal length of the first inverting lens, the first collective lens may suitably be replaced by a combination of two collective lenses. By this means the requirement of an increased collective effect is fulfilled without prejudicing the quality of the image. The inverting lenses should be achromatic double lenses.

In the accompanying drawing an optical system for cystoscopes according to the invention is represented.

The first component of the system shown is an inverting ridge prism $a$. On its exit surface, which lies in the plane of the entrance pupil of the system, a diaphragm $b$ is fixed, the entrance pupil thus becoming a physical one. The lenses are arranged in the following consecutive order: an objective lens $c$, a combination of two collective lenses $d$ and $e$, an achromatic inverting lens $f$, a third collective lens $g$, another achromatic inverting lens $h$ and a Ramsden ocular composed of the field lens $i$ and eye lens $k$.

The path of the rays is shown by means of the principal rays 1 and 2 of the pencils issuing from two lateral object points $o^1$ and $o^2$. For the sake of clearness the full pencils are only indicated in front of the prism $a$ and behind the eye lens $k$. The principal rays 1 and 2 cross each other always on the axis of the system, for the first time within the entrance pupil, in the center of the diaphragm $b$, hereafter in the inverting lens $f$, thirdly in the inverting lens $h$, and finally in the exit pupil $l$ being the real image of the entrance pupil (diaphragm $b$) as produced by the totality of the lenses. Three real images of the object are formed. The objective lens $c$ projects the first image between the collective lenses $d$ and $e$. The first inverting lens $f$ reproduces this image on the place of the collective lens $g$, and this second image is again reproduced by the second inverting lens $h$ closely in front of the field lens $i$ of the ocular. On account of the inverting property of the prism $a$, the first image is an erect one, so that the third image seen by the observer through the eye lens $k$ is again erect.

I claim:

1. A cystoscope system comprising an entrance reflecting system, an objective lens, a plurality of inverting lenses, each reproducing a real image of the object in another real image, a plurality of collective lenses and an ocular.

2. A cystoscope system comprising the following consecutive components: an entrance reflecting prism of the inverting ridge type, an objective lens, a collective lens near the place where the real image of the object is produced by the objective lens, an inverting lens, another collective lens near the place where the second real image of the object is produced by the inverting lens, another inverting lens and an ocular.

3. A cystoscope system consisting of the following consecutive components: an entrance reflecting prism of the inverting ridge type, a diaphragm, an objective lens, a combination of two collective lenses near the place where the real image of the object is produced by the objective lens, an achromatic inverting lens, a third collective lens near the place where the second real image of the object is produced by the inverting lens, another achromatic inverting lens and an ocular.

MORITZ VON ROHR.

Witnesses:
PAUL KRÜGER,
FRITZ SANDER.